US012811227B2

(12) United States Patent
Akizuki

(10) Patent No.: US 12,811,227 B2
(45) Date of Patent: Nov. 24, 2026

(54) SECONDARY BATTERY

(71) Applicant: MURATA MANUFACTURING CO., LTD., Kyoto (JP)

(72) Inventor: Naoto Akizuki, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 384 days.

(21) Appl. No.: 18/762,226

(22) Filed: Jul. 2, 2024

(65) Prior Publication Data

US 2024/0356126 A1 Oct. 24, 2024

Related U.S. Application Data

(63) Continuation of application No. PCT/JP2023/005726, filed on Feb. 17, 2023.

(30) Foreign Application Priority Data

Mar. 17, 2022 (JP) ................................ 2022-042724

(51) Int. Cl.

| | |
|---|---|
| ***H01M 50/186*** | (2021.01) |
| ***H01M 50/107*** | (2021.01) |
| ***H01M 50/152*** | (2021.01) |
| ***H01M 50/474*** | (2021.01) |
| ***H01M 50/477*** | (2021.01) |

(52) U.S. Cl.

CPC ....... *H01M 50/186* (2021.01); *H01M 50/107* (2021.01); *H01M 50/152* (2021.01); *H01M 50/474* (2021.01); *H01M 50/477* (2021.01)

(58) Field of Classification Search

None

See application file for complete search history.

(56) References Cited

U.S. PATENT DOCUMENTS

| | | | |
|---|---|---|---|
| 2023/0049098 | A1 | 2/2023 | Ochi et al. |
| 2023/0083371 | A1 | 3/2023 | Katsumoto et al. |

FOREIGN PATENT DOCUMENTS

| | | | |
|---|---|---|---|
| JP | 2003317807 | A | 11/2003 |
| JP | 2007095653 | A | 4/2007 |
| JP | 2007227366 | A | 9/2007 |
| JP | 2011070824 | A | 4/2011 |
| JP | 2019046639 | A | 3/2019 |
| WO | 2021/221018 | A1 | 11/2021 |
| WO | 2021/229846 | A1 | 11/2021 |

OTHER PUBLICATIONS

International Search Report of corresponding PCT application PCT/JP2023/005726, dated Apr. 25, 2023.

Office Action issued for corresponding Japanese Patent Application No. 2024-507628, dated Jun. 3, 2025. (3 pages.).

*Primary Examiner* — Colin W. Slifka

(74) *Attorney, Agent, or Firm* — K&L Gates LLP

(57) ABSTRACT

A secondary battery is provided and includes an electrode assembly; a first exterior portion housing the electrode assembly and having an opening; a second exterior portion covering the opening and an outer surface of the first exterior portion, the outer surface forming the opening; and an insulator disposed between the outer surface of the first exterior portion and the second exterior portion, the insulator surrounding the opening, the insulator in which an additional member is circularly and intermittently disposed around the opening.

13 Claims, 11 Drawing Sheets

(A)

(B)

SECONDARY BATTERY

CROSS REFERENCE TO RELATED APPLICATIONS

The present application is a continuation of PCT patent application no. PCT/JP2023/005726, filed on Feb. 17, 2023, which claims priority to Japanese patent application no. 2022-042724, filed on Mar. 17, 2022, the entire contents of which are incorporate herein by reference.

BACKGROUND

The present disclosure relates to a secondary battery.

Secondary batteries, which are so-called "storage batteries", can be repeatedly charged and discharged and are used in various applications. For example, secondary batteries are used in mobile devices such as mobile phones, smart phones, and notebook computers. A secondary battery includes an electrode assembly in which an electrode constituting layer including a positive electrode, a negative electrode, and a separator between the positive electrode and the negative electrode is layered, and an exterior body housing the electrode assembly.

SUMMARY

The present disclosure relates to a secondary battery. For example, the present disclosure relates to a secondary battery including an electrode assembly including a positive electrode, a negative electrode, and a separator.

In a secondary battery, an exterior body may be used that includes an exterior portion housing an electrode assembly and an exterior portion as a lid of the exterior portion housing the electrode assembly. In this case, an insulator that seals both the exterior portions can be disposed. From the viewpoint of improving the thermal conductivity between both the exterior portions, a filler may be radially disposed in the insulator in the radial direction. That is, the filler may be disposed to be dispersed in the entire insulator. However, the present inventors have found that a secondary battery having the above-described configuration may still have a possibility of deterioration of the battery characteristics because a fluid such as a gas generated inside and/or outside the battery may flow into the secondary battery or may leak to the outside of the secondary battery.

The present disclosure has been made in view of the above problem. In an embodiment, the present disclosure relates to providing a secondary battery capable of suitably suppressing inflow of a fluid such as a gas into the battery and leakage of the fluid to the outside of the battery.

The present disclosure, in an embodiment, provides a secondary battery including:

- an electrode assembly;
- a first exterior portion housing the electrode assembly and having an opening;
- a second exterior portion covering the opening and an outer surface of the first exterior portion, the outer surface forming the opening; and
- an insulator disposed between the outer surface of the first exterior portion and the second exterior portion, the insulator surrounding the opening,
- the insulator in which an additional member is circularly and intermittently disposed around the opening.

According to the present disclosure, in an embodiment, a secondary battery can be provided that is capable of suitably suppressing inflow of a fluid such as a gas into the battery and leakage of the fluid to the outside of the battery.

DETAILED DESCRIPTION

Figure 1:
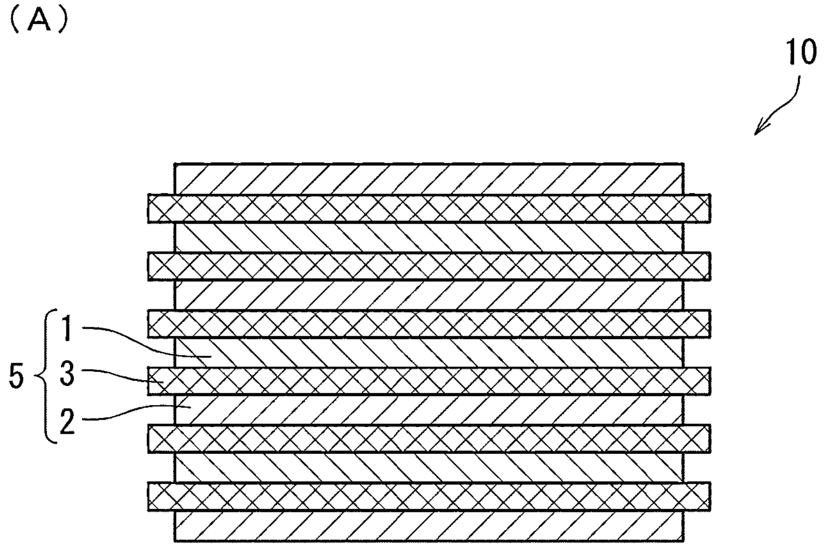
FIG. 1 is a sectional view schematically showing an electrode assembly and includes view (A): planar layered structure, and view (B): wound structure.
Figure 1:
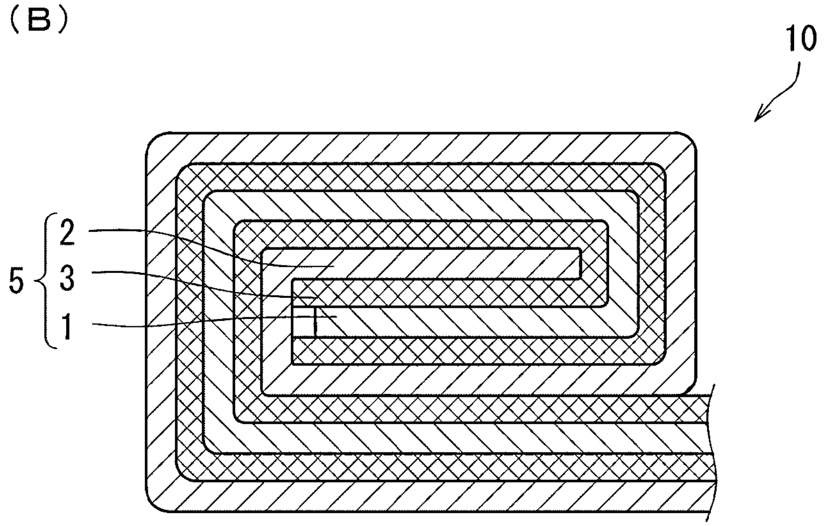

Hereinafter, a secondary battery according to an embodiment of the present disclosure will be described in more detail according to an embodiment. Although the description will be made with reference to the drawings as necessary, various elements in the drawings are only schematically and exemplarily illustrated for understanding of the present disclosure, and the appearances and/or the dimensional ratios may be different from actual ones.

The "sectional view" described directly or indirectly in the present description is based on a virtual section obtained by cutting the secondary battery along the height direction. The "vertical direction" and the "horizontal direction" used directly or indirectly in the present description respectively correspond to the vertical direction and the horizontal direction in the drawings. Unless otherwise specified, the same reference symbols or signs denote the same members or sites, or the same semantic contents. In a preferred aspect, when the layering direction of an electrode assembly can correspond to the vertical direction, it can be understood that the vertical downward direction (that is, the direction in which gravity acts) corresponds to the "downward direction" and the opposite direction corresponds to the "upward direction".

In the present description, the term "secondary battery" refers to a battery that can be repeatedly charged and discharged. Accordingly, the secondary battery according to the present disclosure is not excessively limited by its name, and for example, a power storage device and the like may also be included in the subject of the present disclosure.

The secondary battery according to an embodiment of the present disclosure includes an electrode assembly in which an electrode constituting layer including a positive electrode, a negative electrode, and a separator is layered. FIGS. 1, views (A) and 1(B) illustrate an electrode assembly 10. As shown in FIGS. 1, views (A) and 1(B), a positive electrode 1 and a negative electrode 2 are stacked with a separator 3 interposed therebetween to form an electrode constituting layer 5, and at least one of such an electrode constituting layer 5 is layered to configure the electrode assembly. FIG. 1, view (A) shows a planar layered structure in which the electrode constituting layers 5 are layered in a planar shape without being wound. Meanwhile, FIG. 1, view (B) shows a wound layered structure in which the electrode constituting layer 5 is wound in a wound shape. That is, FIG. 1, view (B) shows a wound structure in which the electrode constituting layer including the positive electrode, the negative electrode, and the separator disposed between the positive electrode and the negative electrode is wound in a roll shape. In the secondary battery, such an electrode assembly is enclosed together with an electrolyte (for example, a non-aqueous electrolyte) in an exterior body. The structure of the electrode assembly is not necessarily limited to the planar layered structure or the wound structure. For example, the electrode assembly may have a so-called stack-and-folding structure in which a positive electrode, a separator, and a negative electrode are stacked on a long film and then folded.

The positive electrode includes at least a positive electrode material layer and a positive electrode current collector. In the positive electrode, the positive electrode material layer is provided on at least one surface of the positive electrode current collector. The positive electrode material layer contains a positive electrode active material as an electrode active material. For example, for each of a plurality of positive electrodes in the electrode assembly, the positive electrode material layer may be provided on both surfaces of the positive electrode current collector, or may be provided only on one surface of the positive electrode current collector.

The negative electrode includes at least a negative electrode material layer and a negative electrode current collector. In the negative electrode, the negative electrode material layer is provided on at least one surface of the negative electrode current collector. The negative electrode material layer contains a negative electrode active material as an electrode active material. For example, for each of a plurality of negative electrodes in the electrode assembly, the negative electrode material layer may be provided on both surfaces of the negative electrode current collector, or may be provided only on one surface of the negative electrode current collector.

The electrode active materials contained in the positive electrode and the negative electrode, that is, the positive electrode active material and the negative electrode active material are materials directly involved in transfer of electrons in the secondary battery, and are main materials of the positive and negative electrodes that are responsible for charge and discharge, that is, a battery reaction. More specifically, ions are brought into the electrolyte due to the "positive electrode active material contained in the positive electrode material layer" and the "negative electrode active material contained in the negative electrode material layer", and the ions move between the positive electrode and the negative electrode to transfer electrons, and thus charge and discharge is performed. The positive electrode material layer and the negative electrode material layer may be layers particularly capable of occluding and releasing lithium ions. That is, the secondary battery according to the present disclosure may be a non-aqueous electrolyte secondary battery in which lithium ions move between a positive electrode and a negative electrode through a non-aqueous electrolyte to charge and discharge the battery. In a case where lithium ions are involved in charge and discharge, the secondary battery according to the present disclosure corresponds to a so-called "lithium ion battery", and the positive electrode and the negative electrode include a layer capable of occluding and releasing lithium ions.

The positive electrode active material in the positive electrode material layer includes, for example, a granule, and the positive electrode material layer may contain a binder for further sufficient contact between the particles and shape retention. Furthermore, the positive electrode material layer may contain a conductive auxiliary in order to facilitate electron transfer promoting the battery reaction. Similarly, the negative electrode active material in the negative electrode material layer includes, for example, a granule, and the negative electrode material layer may contain a binder for further sufficient contact between the particles and shape retention, and may contain a conductive auxiliary in order to facilitate electron transfer promoting the battery reaction. As described above, the positive electrode material layer and the negative electrode material layer have a form containing a plurality of components, and therefore may also be referred to as "positive electrode mixture layer" and "negative electrode mixture layer", respectively.

The positive electrode active material may be a material that contributes to occlusion and release of lithium ions. From such a viewpoint, the positive electrode active material may be, for example, a lithium-containing composite oxide. More specifically, the positive electrode active material may be a lithium-transition metal composite oxide containing lithium and at least one transition metal selected from the group consisting of cobalt, nickel, manganese, and iron. That is, the positive electrode material layer of the secondary battery according to the present disclosure preferably contains such a lithium-transition metal composite oxide as the positive electrode active material. For example, the positive electrode active material may be lithium cobalt oxide, lithium nickel oxide, lithium manganese oxide, lithium iron phosphate, or a material obtained by replacing the transition metal in a positive electrode active material described above with another metal. Such positive electrode active materials may be contained singly, or in combination of two or more thereof.

The binder that can be contained in the positive electrode material layer is not particularly limited, and examples of the binder include at least one selected from the group consisting of polyvinylidene fluoride, vinylidene fluoride-hexafluoropropylene copolymers, vinylidene fluoride-tetrafluoroethylene copolymers, polytetrafluoroethylene, and the like. The conductive auxiliary that can be contained in the positive electrode material layer is not particularly limited, and examples of the conductive auxiliary include at least one selected from carbon blacks such as thermal black, furnace black, channel black, Ketjen black, and acetylene black, carbon fibers such as graphite, carbon nanotubes, and vapor-grown carbon fibers, metal powders such as copper, nickel, aluminum, and silver, polyphenylene derivatives, and the like.

The thickness dimension of the positive electrode material layer is not particularly limited, and may be 1 μm or more and 300 μm or less, and is, for example, 5 μm or more and 200 μm or less. The thickness dimension of the positive electrode material layer is the thickness inside the secondary battery, and the average of values measured at arbitrary 10 locations may be adopted.

The negative electrode active material may be a material that contributes to occlusion and release of lithium ions. From such a viewpoint, the negative electrode active material may be, for example, various carbon materials, oxides, and/or lithium alloys.

Examples of the various carbon materials for the negative electrode active material can include graphite (natural graphite and/or artificial graphite), hard carbon, soft carbon, and/or diamond-like carbon. In particular, graphite has high electron conductivity, and is excellent in adhesiveness to the negative electrode current collector. Examples of the negative electrode active material include at least one selected from the group consisting of silicon, silicon oxide, tin oxide, tin alloys, titanium oxide-based materials such as lithium titanate, metallic lithium, indium oxide, zinc oxide, lithium alloys, silicon alloys, and the like. The lithium alloy of the negative electrode active material may be an alloy of any metal as long as the metal can be alloyed with lithium, and the lithium alloy may be, for example a binary, ternary, or higher alloy of a metal such as Al, Si, Pb, Sn, In, Bi, Ag, Ba, Ca, Hg, Pd, Pt, Te, Zn, or La and lithium. Such an active material may be amorphous in its structural form. This is because deterioration due to nonuniformity such as a crystal grain boundary or a defect is less likely to be caused.

The binder that can be contained in the negative electrode material layer is not particularly limited, and examples of the binder include at least one selected from the group consisting of styrene-butadiene rubber, polyacrylic acid, polyvinylidene fluoride, polyimide-based resins, and polyamide-imide-based resins. The binder contained in the negative electrode material layer may be styrene-butadiene rubber. The conductive auxiliary that can be contained in the negative electrode material layer is not particularly limited, and examples of the conductive auxiliary include at least one selected from carbon blacks such as thermal black, furnace black, channel black, Ketjen black, and acetylene black, carbon fibers such as graphite, carbon nanotubes, and vapor-grown carbon fibers, metal powders such as copper, nickel, aluminum, and silver, polyphenylene derivatives, and the like. Note that the negative electrode material layer may contain a component derived from a thickener component (for example, a carboxymethyl cellulose) used at the time of manufacturing the battery.

The thickness dimension of the negative electrode material layer is not particularly limited, and may be 1 μm or more and 300 μm or less, and is, for example, 5 μm or more and 200 μm or less. The thickness dimension of the negative electrode material layer is the thickness inside the secondary battery, and the average of values measured at arbitrary 10 locations may be adopted.

The positive electrode current collector and the negative electrode current collector used in the positive electrode and the negative electrode are members that contribute to collecting and supplying electrons generated in the electrode active material due to the battery reaction. Such an electrode current collector may be a sheet-like metal member. Furthermore, the electrode current collector may have a porous or perforated form. For example, the current collector may be a metal foil, a punching metal, a net, an expanded metal, or the like. The positive electrode current collector used in the positive electrode preferably includes a metal foil containing at least one selected from the group consisting of aluminum, stainless steel, nickel, and the like, and may be, for example, an aluminum foil. Meanwhile, the negative electrode current collector used in the negative electrode preferably includes a metal foil containing at least one selected from the group consisting of copper, stainless steel, nickel, and the like, and may be, for example, a copper foil.

The thickness dimension of each of the positive electrode current collector and the negative electrode current collector is not particularly limited, and may be 1 μm or more and 100 μm or less, and is, for example, 10 μm or more and 70 μm or less. The thickness dimension of each of the positive electrode current collector and the negative electrode current collector is the thickness inside the secondary battery, and the average of values measured at arbitrary 10 locations may be adopted.

The separator used in the positive electrode and the negative electrode is a member provided from the viewpoint of, for example, preventing a short circuit due to contact between the positive electrode and the negative electrode and maintaining the electrolyte. In other words, the separator can be considered as a member that allows ions to pass through while preventing electronic contact between the positive electrode and the negative electrode. For example, the separator is a porous or microporous insulator, and has a membrane form due to its small thickness. A microporous membrane made of a polyolefin may be used as the separator, although merely an example. In this respect, the microporous membrane used as the separator may contain, for example, only polyethylene (PE) or polypropylene (PP) as the polyolefin. Furthermore, the separator may be a laminate including a "microporous membrane made of PE" and a "microporous membrane made of PP". The surface of the separator may be covered with an inorganic particle coating layer and/or an adhesive layer and the like. The surface of the separator may have adhesiveness. In the present disclosure, the separator is not to be particularly limited by its name, and may be, for example, a solid electrolyte, a gel-like electrolyte, and/or an insulating inorganic particle having a similar function.

The thickness dimension of each separator is not particularly limited, and may be 1 μm or more and 100 μm or less, and is, for example, 2 μm or more and 20 μm or less. The thickness dimension of the separator is the thickness inside the secondary battery (particularly, the thickness between the positive electrode and the negative electrode), and the average of values measured at arbitrary 10 locations may be adopted.

In the secondary battery according to an embodiment of the present disclosure, the electrode assembly including the electrode constituting layer including the positive electrode, the negative electrode, and the separator may be enclosed together with the electrolyte in the exterior body. The electrolyte may be a "non-aqueous" electrolyte containing an organic electrolyte, an organic solvent, and the like, or may be an "aqueous" electrolyte containing water. In a case where the positive electrode and the negative electrode have a layer capable of occluding and releasing lithium ions, the electrolyte is preferably a "non-aqueous" electrolyte such as an organic electrolyte and an organic solvent. That is, the electrolyte is preferably a non-aqueous electrolyte. In the electrolyte, metal ions released from the electrodes (the positive electrode and/or the negative electrode) are present, and therefore the electrolyte can assist movement of metal ions in the battery reaction. The electrolyte may have a form such as a liquid form or a gel form.

The non-aqueous electrolyte is an electrolyte containing a solvent and a solute. The solvent may be an organic solvent. A specific organic solvent of the non-aqueous electrolyte may contain at least a carbonate. The carbonate may be a cyclic carbonate and/or a chain carbonate. Although not particularly limited, examples of the cyclic carbonate include at least one selected from the group consisting of propylene carbonate (PC), ethylene carbonate (EC), butylene carbonate (BC), and vinylene carbonate (VC). Examples of the chain carbonate include at least one selected from the group consisting of dimethyl carbonate (DMC), diethyl carbonate (DEC), ethyl methyl carbonate (EMC), and dipropyl carbonate (DPC). Although merely an example, a combination of a cyclic carbonate and a chain carbonate may be used as the non-aqueous electrolyte, and for example, a mixture of an ethylene carbonate and a diethyl carbonate may be used. As a specific solute of the non-aqueous electrolyte, for example, a Li salt such as $LiPF_6$ and/or $LiBF_4$ may be used.

Hereinafter, characteristic parts of the present disclosure will be described. Although the description will be made with reference to the drawings as necessary, the illustrated contents are only schematically and exemplarily illustrated for understanding of the present disclosure, and the appearances, the dimensional ratios, and the like may be different from actual ones.

Figure 2:
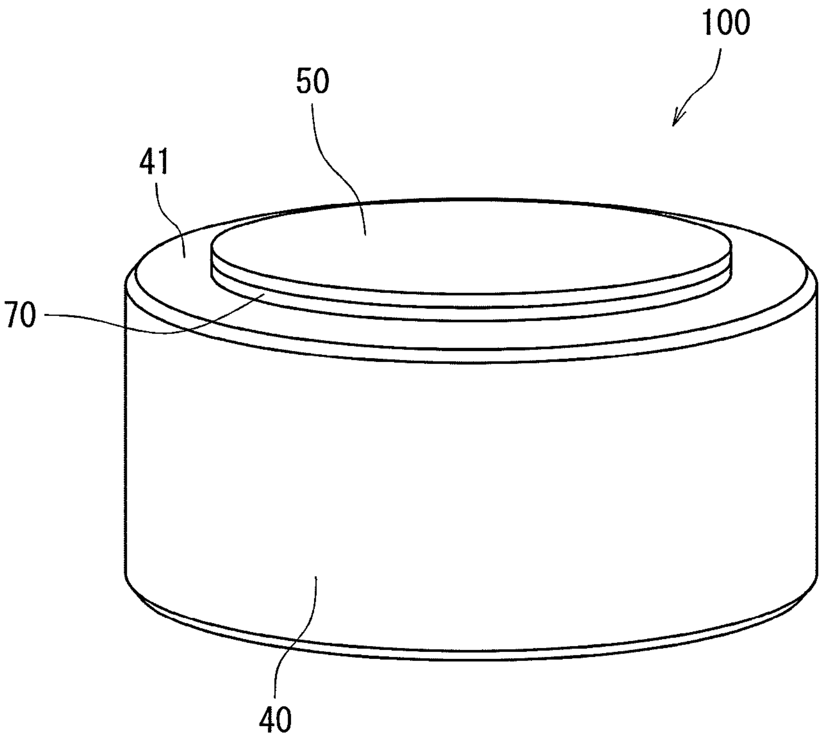
FIG. 2 is a perspective view schematically showing a configuration of a secondary battery according to an embodiment of the present disclosure.
Figure 3:
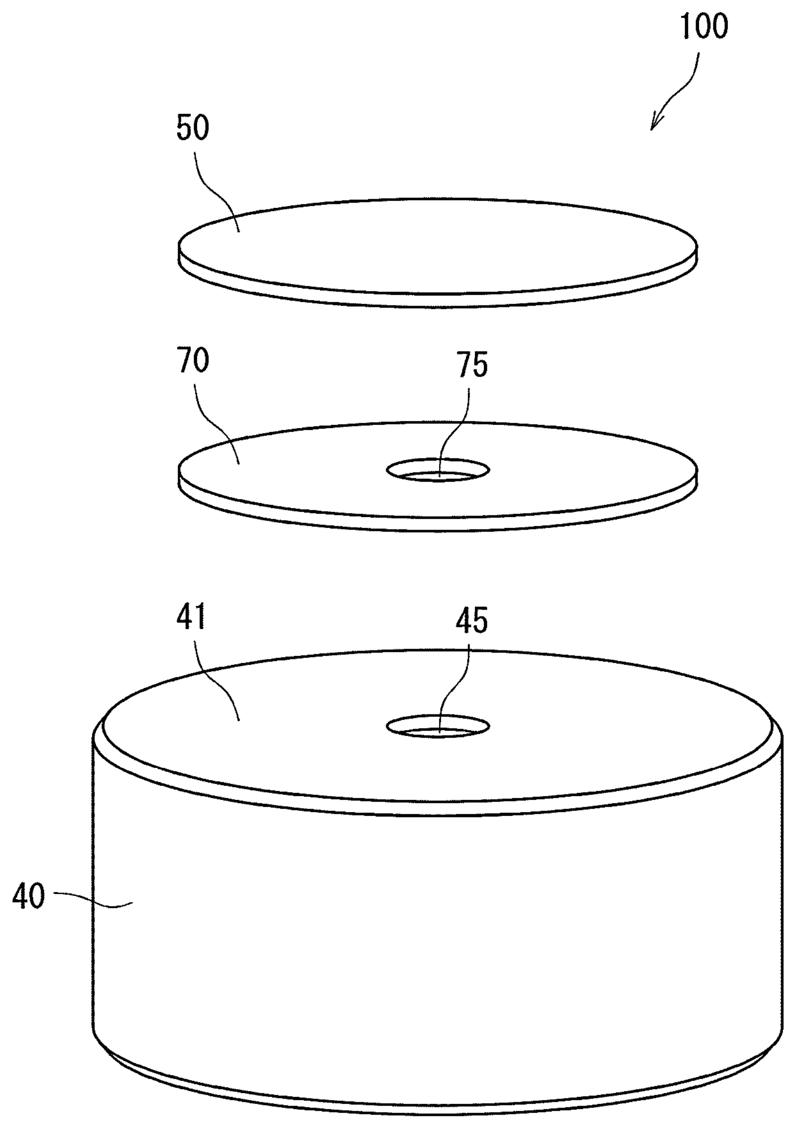
FIG. 3 is an exploded perspective view schematically showing a configuration of a secondary battery according to an embodiment of the present disclosure.

FIG. 2 shows a perspective view schematically illustrating a configuration of the secondary battery according to an embodiment of the present disclosure. FIG. 3 shows an exploded perspective view schematically illustrating a configuration of the secondary battery according to an embodiment of the present disclosure.

As shown in FIGS. 2 and 3, the secondary battery according to an embodiment of the present disclosure includes a first exterior portion 40, a second exterior portion 50, and an insulator 70 provided between the first exterior portion 40 and the second exterior portion 50. Specifically, the first exterior portion 40 has an opening 45, and can house the electrode assembly. The first exterior portion 40 has an outer surface 41 forming the opening 45. The insulator 70 surrounds the opening 45 and is disposed between the outer surface 41 of the first exterior portion 40 and the second exterior portion 50. The second exterior portion 50 is provided so as to cover the opening 45 of the first exterior portion 40 and the outer surface 41 of the first exterior portion 40 forming the opening 45.

The insulator 70 is sandwiched between the first exterior portion 40 and the second exterior portion 50. The first exterior portion 40 and the second exterior portion 50 are adhered to each other and insulated by the insulator 70 to configure the exterior body of the secondary battery. The exterior body encloses and protects the electrode assembly 10, an electrolytic solution 20, and the like in the battery. The "enclosure" and the "protection" prevents a gas from flowing in from the outside of the battery and leaking from the inside of the battery through the first exterior portion 40 and the second exterior portion 50.

Meanwhile, the insulator 70 contributes to adhesion and insulation between the first exterior portion 40 and the second exterior portion 50. The insulator 70 is more easily penetrated and permeated by a fluid such as a gas than the first exterior portion 40 and the second exterior portion 50. Therefore, a fluid such as a gas can flow into the battery and/or leak to the outside of the battery through the insulator 70. That is, the insulator 70 can serve as a passage for movement of a fluid such as a gas between the inside of the battery and the outside of the battery.

Therefore, the present application is based on intensively studied improvement measures to solve the above point, for example, and as a result, have devised the present disclosure according to an embodiment. The secondary battery according to an embodiment of the present disclosure is characterized by the configuration of the insulator 70 described above (see FIG. 4).

Figure 4:
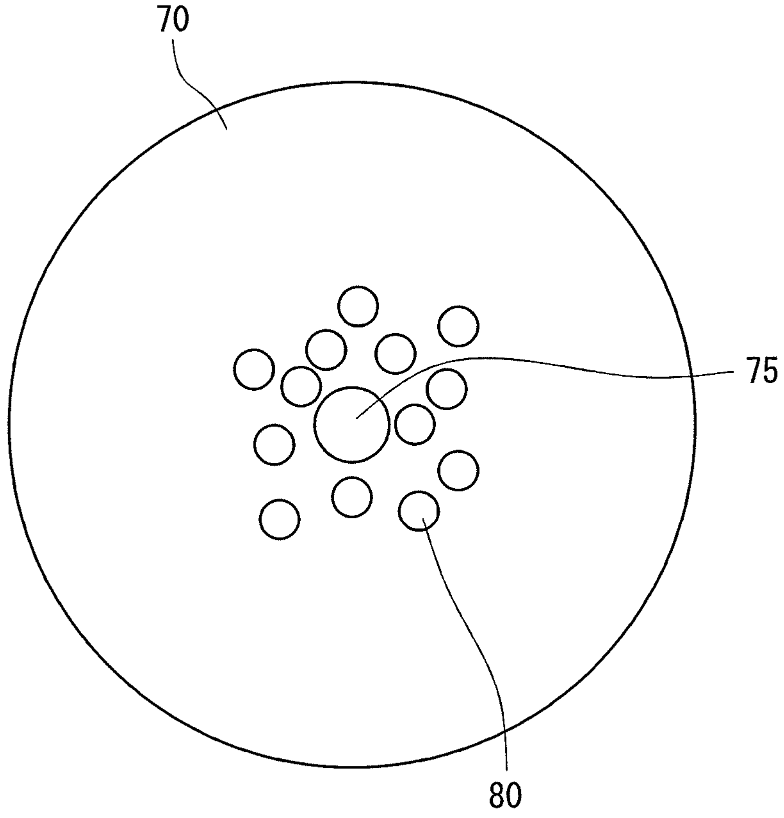
FIG. 4 is a schematic view for explanation of an aspect of disposing an additional member according to an embodiment.
Figure 5:
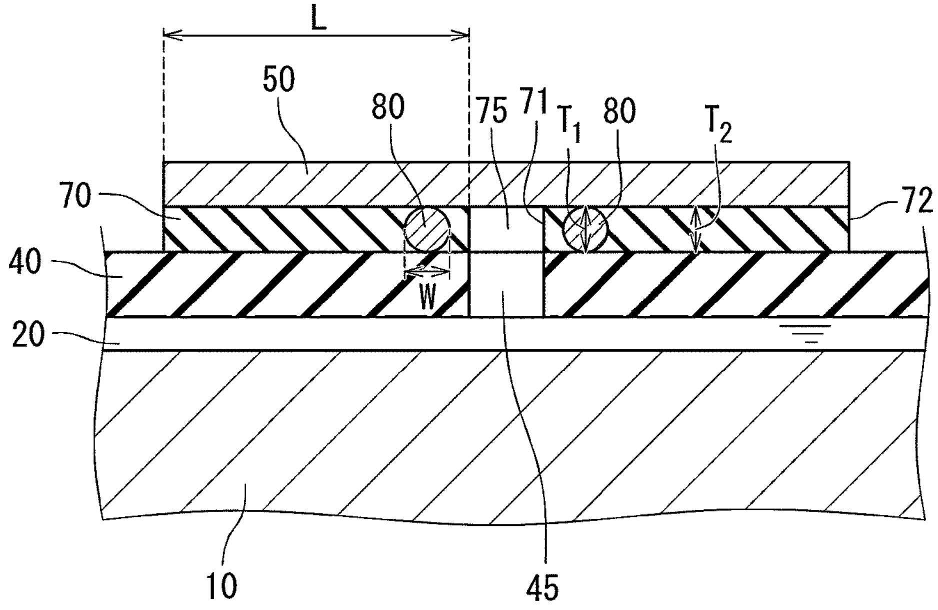
FIG. 5 is a schematic sectional view for explanation of characteristics of a secondary battery according to an embodiment of the present disclosure.

Specifically, as illustrated in FIGS. 3 to 5, in the insulator 70, an additional member 80 is circularly and intermittently disposed around the opening 45. Since the additional member 80 is disposed in such a manner, the insulator 70 roughly has a region where the additional member 80 is provided and a region where the additional member 80 is not provided. Such an arrangement of the additional member 80 is different from a radial arrangement of a filler in the radial direction of the insulator 70. That is, the additional member 80 is not disposed to be dispersed in the entire insulator.

The term "additional member" in the present description means a member additionally provided for the insulator. The term "circularly" in the present description means to have a shape and/or an appearance that goes around a predetermined range. Specifically, the arrangement in which the additional member is "circularly" disposed in the present description means an arrangement in which the region where the additional member is disposed surrounds the region where the additional member is not disposed as a whole. The term "intermittently" in the present description refers to be in a state of being continuous with an interruption. In other words, the term "intermittently" refers to be in a state in which a discontinuous part is present between continuous parts. Specifically, the arrangement in which the additional member is "intermittently" disposed in the present description may refer to an arrangement in which there are a location where the additional member is present and a location where the additional member is absent. For example, in the arrangement in which the additional member is "intermittently" disposed, the additional member may be continuously disposed with a gap. In one aspect, in the arrangement in which the additional member is "intermittently" disposed, the additional member may be continuously disposed with gaps at regular intervals, or may be continuously disposed with gaps at irregular intervals. That is, the phrase "the additional member is circularly and intermittently disposed" in the present description means that the additional member is continuously disposed with a gap and go around a predetermined range as illustrated in FIG. 4.

The secondary battery of the present disclosure can exhibit the effects described below by adopting the above configuration.

Figure 12:
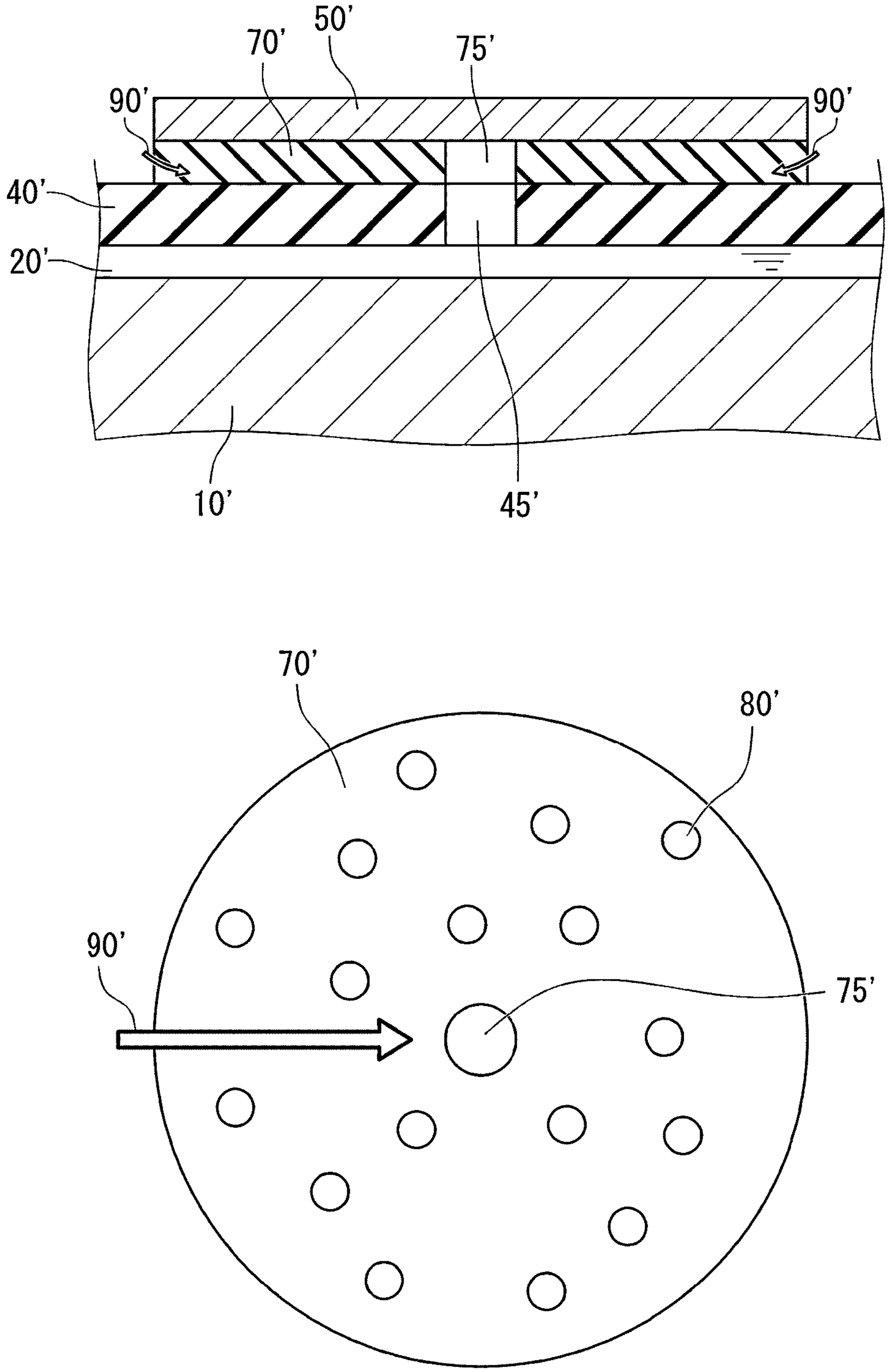
FIG. 12 is a schematic sectional view for explanation of a state of movement of a fluid in a conventional secondary battery from the outside to the inside of the battery.
Figure 13:
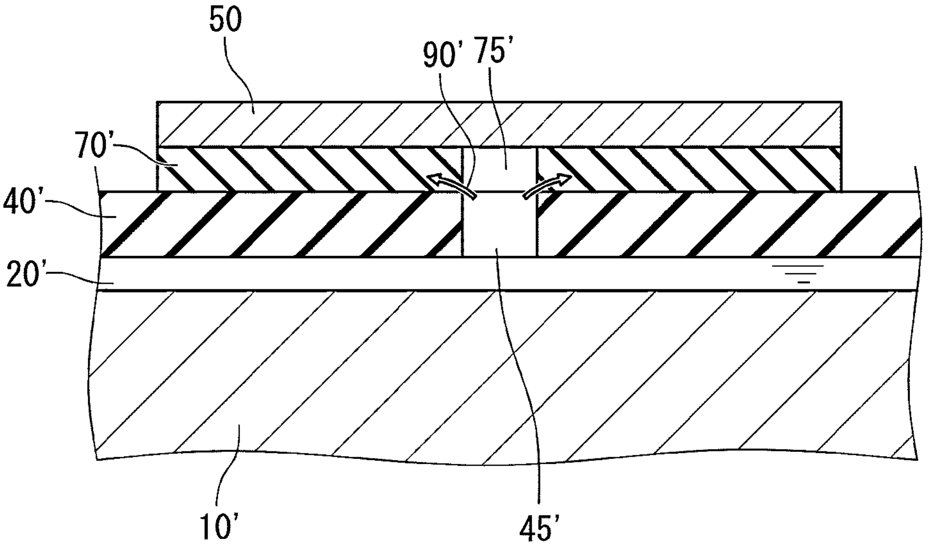
FIG. 13 is a schematic sectional view for explanation of a state of movement of a fluid in a conventional secondary battery from the inside to the outside of the battery.
Figure 13:
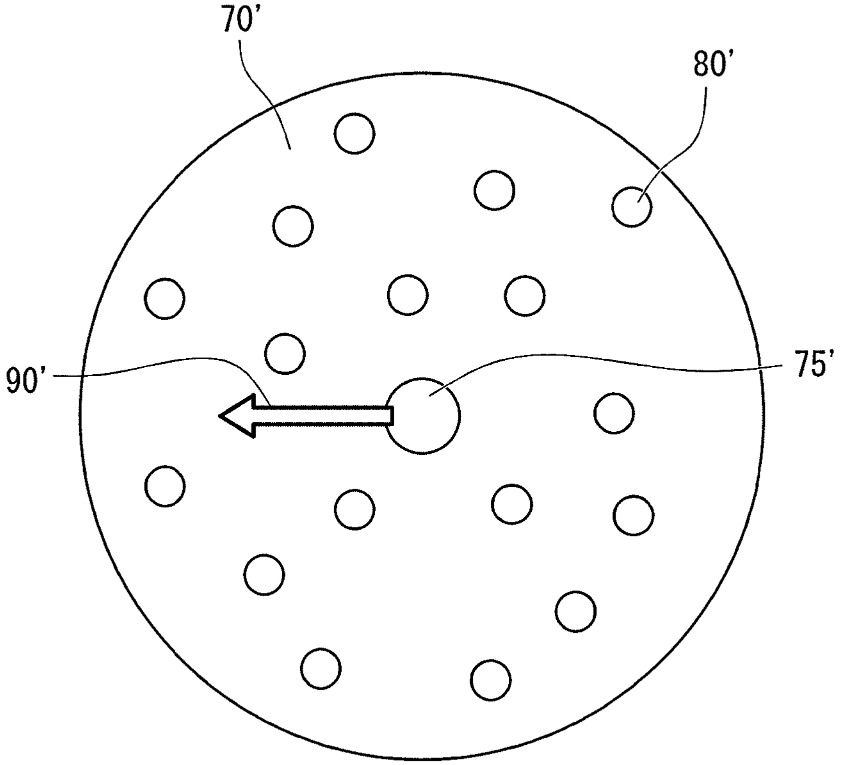

FIGS. 12 and 13 show schematic plan views of an insulator of a conventional secondary battery. As shown in FIGS. 12 and 13, in a conventional secondary battery, a filler may be radially disposed in an insulator 70' in the radial direction. That is, the filler may be disposed to be dispersed in the entire insulator. In such a dispersion arrangement form of the filler in the entire insulator 70', the filler is disposed sparsely as a whole, and therefore cannot sufficiently reduce the passage in the insulator 70' through which a fluid between the inside of the secondary battery and the outside of the secondary battery can move. That is, in the dispersion arrangement form, a fluid such as a gas easily moves between the inside of the secondary battery and the outside of the secondary battery through the insulator 70'. For example, moisture 90' and the like in the external environment may intrude into an electrode assembly 10' inside the secondary battery through the insulator 70' (see FIG. 12). Alternatively, a volatilized electrolytic solution 91' and the like inside the secondary battery may leak to the outside of the secondary battery through the insulator 70' (see FIG. 13). Such movement of a fluid may result in deterioration of the battery characteristics of the secondary battery.

Meanwhile, in the insulator 70 of the secondary battery according to an embodiment of the present disclosure, as illustrated in FIG. 4, the additional member 80 is circularly and intermittently disposed around the opening 45. Since the additional member 80 is "circularly and intermittently disposed around the opening" in the insulator 70, the additional member 80 can be more suitably provided against the path through which a fluid between the outside of the secondary battery and the inside of the secondary battery can pass. Specifically, in the arrangement form in which the additional member 80 is "circularly and intermittently disposed around the opening", the additional member 80 can be disposed in a local part of the insulator 70 relatively more densely than in the dispersion arrangement form (that is, a sparse arrangement form) of the additional member (corresponding to the above-described conventional filler) in the insulator. Thus, the path for movement of a fluid such as a gas in the insulator 70 can be blocked or closed in the local part of the insulator 70 more efficiently and easily than in the dispersion arrangement form (that is, a sparse arrangement form) of a conventional additional member (corresponding to the above-described conventional filler) in the insulator. Thus, it is possible to further reduce the passage of a fluid that can pass between the outside of the secondary battery and the inside of the secondary battery.

As a result, mutual movement of a fluid such as a gas can be suppressed between the region located inside the circling shape of the additional member 80 disposed circularly (for example, one region of the insulator 70, or for example, a region proximal to the center side of the insulator 70) (corresponding to the region where the additional member is not disposed) and the region located outside the circling shape of the additional member 80 disposed circularly (for example, the other region of the insulator 70, or for example, a region proximal to the outer peripheral side of the insulator 70) (corresponding to the region where the additional member is not disposed). Therefore, according to the present disclosure, inflow of a fluid such as a gas into the battery and leakage of the fluid to the outside of the battery can be suitably suppressed. The circling shape of the additional member 80 disposed circularly means a shape formed by disposing the additional member 80 circularly. For example, the circling shape of the additional member 80 in FIGS. 4, 6, and the like can be regarded as an annular shape or a circular shape.

In the present disclosure, the additional member needs to be disposed both circularly and intermittently. For example, in a case where the additional member is disposed only "circularly", the additional member can have an arrangement form so as to go around (environ) a predetermined range (for example, the opening of the first exterior portion), but cannot have a relatively dense arrangement form in a local part of the insulator. In such an arrangement form, the arrangement form of the additional member in the insulator is likely to be sparse, and inflow of a fluid such as a gas into the battery and leakage of the fluid to the outside of the battery are difficult to suppress.

In a case where the additional member is disposed only "intermittently", the additional member cannot have an arrangement form so as to go around (environ) a predetermined range of the insulator (for example, the opening of the first exterior portion) (for example, a semicircular arrangement form). Such an arrangement form can suppress movement of a fluid such as a gas from one direction of the insulator, but cannot suppress movement of a fluid such as a gas from another direction of the insulator. Therefore, inflow of a fluid such as a gas into the battery and leakage of the fluid to the outside of the battery are difficult to suppress.

In a secondary battery 100 according to an embodiment of the present disclosure, the additional member 80 is "circularly and intermittently disposed around the opening" in the insulator 70, and thus can have an arrangement form in which the additional member 80 is disposed in a local part of the insulator 70 as illustrated in FIG. 4. That is, in the present disclosure, the secondary battery 100 can also have a predetermined region of the insulator 70 where the additional member 80 is not provided. As described above, the insulator 70 can have a function of maintaining adhesion between the first exterior portion 40 and the second exterior portion 50. The predetermined region of the insulator 70 where the additional member 80 is not provided can further maintain the adhesion function inherent in the insulator 70. Therefore, in the present disclosure, the adhesion between the first exterior portion 40 and the second exterior portion 50 can be suitably maintained.

The secondary battery 100 of the present disclosure can maintain the adhesion between the first exterior portion 40 and the second exterior portion 50 while further suppressing fluid movement in the insulator 70. That is, both suppression of fluid movement and securing of an adhesion maintenance function of the insulator can be achieved.

As described above, the additional member 80 is "circularly and intermittently disposed around the opening" in the insulator 70, and thus can have an arrangement form in which the additional member 80 is disposed in a local part of the insulator 70. In other words, in the secondary battery 100 of the present disclosure, the additional member 80 can have a form in which the additional member 80 in not disposed in the entire insulator 70. In this regard, the amount of the additional member 80 provided for the insulator 70 can be relatively smaller than that in the case of providing the additional member 80 in the entire insulator 70. A relatively small amount of the additional member 80 can further suppress fluid movement in the insulator 70 as described above as long as the additional member 80 is "circularly and intermittently disposed around the opening" in the insulator 70. That is, in the present disclosure, if the additional member 80 is "circularly and intermittently disposed around the opening" in the insulator 70, fluid movement in the insulator 70 can be effectively suppressed.

The term "fluid" in the present description means a liquid and/or a gas. Examples of the liquid that moves between the inside of the battery and the outside of the battery include moisture in the external environment and/or the electrolyte and the like in the battery. Examples of the gas that moves between the inside of the battery and the outside of the battery include the volatilized electrolyte inside the battery (that is, the electrolyte in a gaseous state) and/or water vapor generated by evaporation of moisture in the external environment, a gas, and the like. Examples of the electrolyte include the electrolytes described above in the present description.

Hereinafter, the constituent elements of the secondary battery of the present disclosure will be described in detail.

The first exterior portion and/or the second exterior portion may be a metal exterior portion having a non-laminate configuration. This means that the exterior portion is not a laminated member or the like including a metal sheet, a fusion layer, and a protective layer. It can be said that the exterior portion in the present disclosure may be different from an exterior portion of a soft case battery corresponding to a pouch including a so-called laminated film. The metal exterior portion having a non-laminated configuration preferably has a configuration including a single metal member. For example, such a metal exterior portion may be a single member including a metal such as stainless steel (SUS) and/or aluminum. The term "single metal member" as used herein means that the exterior portion does not have a so-called laminate configuration in a broad sense, and means that the exterior portion is a member including substantially only a metal in a narrow sense. Therefore, if the metal exterior portion is a member including substantially only a metal, the surface of the metal exterior portion may be subjected to an appropriate surface treatment. For example, in a cut section obtained by cutting such a metal exterior portion in the thickness direction, a single metal layer can be confirmed except for a portion subjected to a surface treatment or the like. The term "stainless steel" in the present description refers to, for example, stainless steel specified in "JIS G 0203 Glossary of terms used in iron and steel", and the stainless steel may be chromium or alloy steel containing chromium and nickel.

The first exterior portion and the second exterior portion are integrated with each other (for example, integrated by adhesion, welding, or the like) to form an "exterior body".

In an embodiment, the first exterior portion in the present description may be a cup-shaped exterior portion. The term "cup-shaped exterior portion" in the present description means a member that includes a side wall or a side surface portion corresponding to a body portion and a main surface (in a typical aspect, for example, a bottom portion) continuous with the side wall or the side surface portion, and a hollow portion is formed inside the member. The electrode assembly in which the electrode constituting layer including the positive electrode, the negative electrode, and the separator is layered can be housed or enclosed in the hollow portion.

In an embodiment, the second exterior portion in the present description may be a lid-shaped exterior portion. The term "lid-shaped exterior portion" in the present description means an exterior portion provided on the cup-shaped exterior portion. In other words, the lid-shaped exterior portion means a member provided as a lid for the opening of the cup-shaped exterior portion. The lid-shaped exterior portion may be, for example, a single member extending in the same plane (typically a flat plate-shaped member).

The first exterior portion and/or the second exterior portion may also function as a terminal. In the present description, the term "terminal" means an output terminal provided, in the secondary battery, for connection with an external device.

In the present description, the term "insulator" means a member that is interposed between the first exterior portion and the second exterior portion and contributes to "insulation" therebetween. The kind of the insulator is not particularly limited as long as the insulator exhibits an "insulating property". The insulator preferably has not only the "insulating property" but also a "fusing property". For example, the insulator may include a thermoplastic resin. The insulator may include a polyolefin such as polyethylene and/or polypropylene, as merely a specific example. Viewed from another aspect, the insulator may include a component of an adhesive material that exhibits an insulating property. Examples of such an adhesive material include acrylic-based adhesive materials such as acrylic acid ester copolymers, rubber-based adhesive materials such as natural rubber, silicone-based adhesive materials such as silicone rubber, urethane-based adhesive materials such as a urethane resin, α-olefin-based adhesive materials, ether-based adhesive materials, ethylene-vinyl acetate resin-based adhesive materials, epoxy resin-based adhesive materials, vinyl chloride resin-based adhesive materials, chloroprene rubber-based adhesive materials, cyanoacrylate-based adhesive materials, aqueous polymer-isocyanate-based adhesive materials, styrene-butadiene rubber-based adhesive materials, nitrile rubber-based adhesive materials, nitrocellulose-based adhesive materials, reactive hot-melt-based adhesive materials, phenol resin-based adhesive materials, modified silicone-based adhesive materials, polyamide resin-based adhesive materials, polyimide-based adhesive materials, polyurethane resin-based adhesive materials, polyolefin resin-based adhesive materials, polyvinyl acetate resin-based adhesive materials, polystyrene resin solvent-based adhesive materials, polyvinyl alcohol-based adhesive materials, polyvinyl pyrrolidone resin-based adhesive materials, polyvinyl butyral resin-based adhesive materials, polybenzimidazole-based adhesive materials, polymethacrylate resin-based adhesive materials, melamine resin-based adhesive materials, urea resin-based adhesive materials, and/or resorcinol-based adhesive materials.

As illustrated in FIG. 2, the insulator 70 may be provided so as to extend to the outer edge of the second exterior portion 50. That is, the insulator 70 may be provided so that the outer edge of the second exterior portion 50 and the outer edge of the insulator 70 are on the same line. In other words, the outer side surface of the insulator 70 and the outer side surface of the second exterior portion 50 may be flush with each other. As illustrated in FIG. 3, the insulator 70 may be provided so as to extend to the opening edge of the opening 45 of the first exterior portion 40. In other words, the inner side surface of the insulator 70 forming a through-hole 75 and the inner side surface of the first exterior portion 40 forming the opening 45 may be flush with each other. As can be seen from the form illustrated in FIG. 2, the insulator 70 may have a shape along each of the second exterior portion 50 and the first exterior portion 40. That is, the main surface of the insulator 70 and the main surface of the second exterior portion 50 may have an arrangement relationship to be in parallel with each other. The main surface of the insulator 70 and the main surface of the first exterior portion 40 may have an arrangement relationship to be in parallel with each other. The insulator 70 may have a constant thickness between the exterior portion 50 on the lid and the first exterior portion 40.

The thickness of the insulator may be, for example, 1 μm or more and 500 μm or less, and preferably 5 μm or more and 300 μm or less. If the thickness of the insulator is in the above range, an effect of the present disclosure is more likely to be apparent.

Hereinafter, the arrangement form of the additional member in the insulator will be described in detail. The arrangement form of the additional member is not particularly limited as long as the additional member is "disposed circularly and intermittently around the opening".

Figure 9:
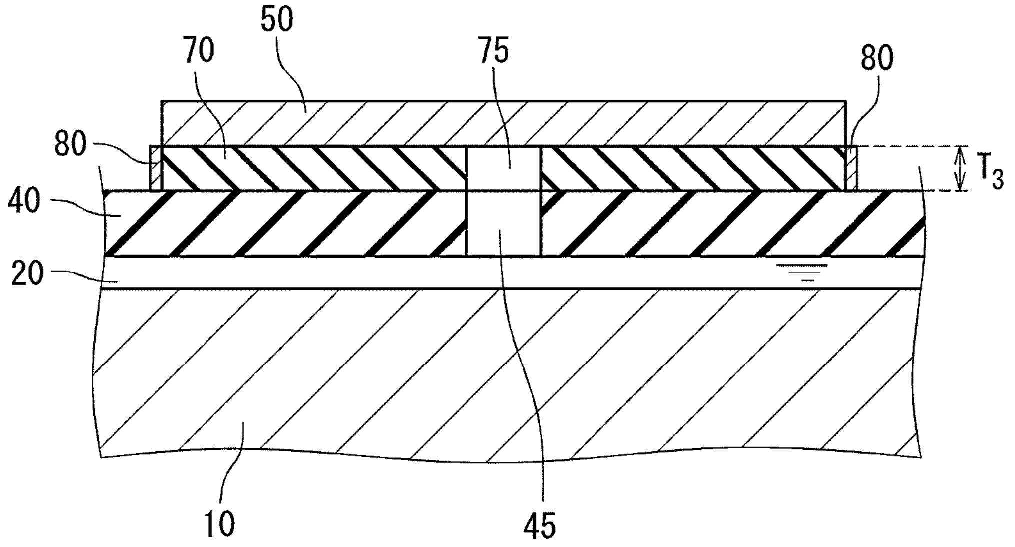
FIG. 9 is a schematic sectional view for explanation of an aspect of disposing an additional member according to an embodiment.

In one aspect, the additional member 80 may be unevenly distributed in the insulator 70. For example, as illustrated in FIG. 4, the additional member 80 may be unevenly distributed in the insulator 70. Alternatively, as illustrated in FIG. 9, the additional member 80 may be unevenly distributed on the surface of the insulator 70. That is, the additional member 80 may be disposed only in a part of the insulator 70. The phrase "the additional member is unevenly distributed in the insulator" in the present description means that the additional member 80 is provided only at a predetermined location of the insulator 70, and that the insulator 70 has a location at which the additional member 80 is not provided. In one aspect, the fact that the additional member is unevenly distributed in the insulator may mean that the additional member is not uniformly dispersed in the entire insulator.

Figure 6:
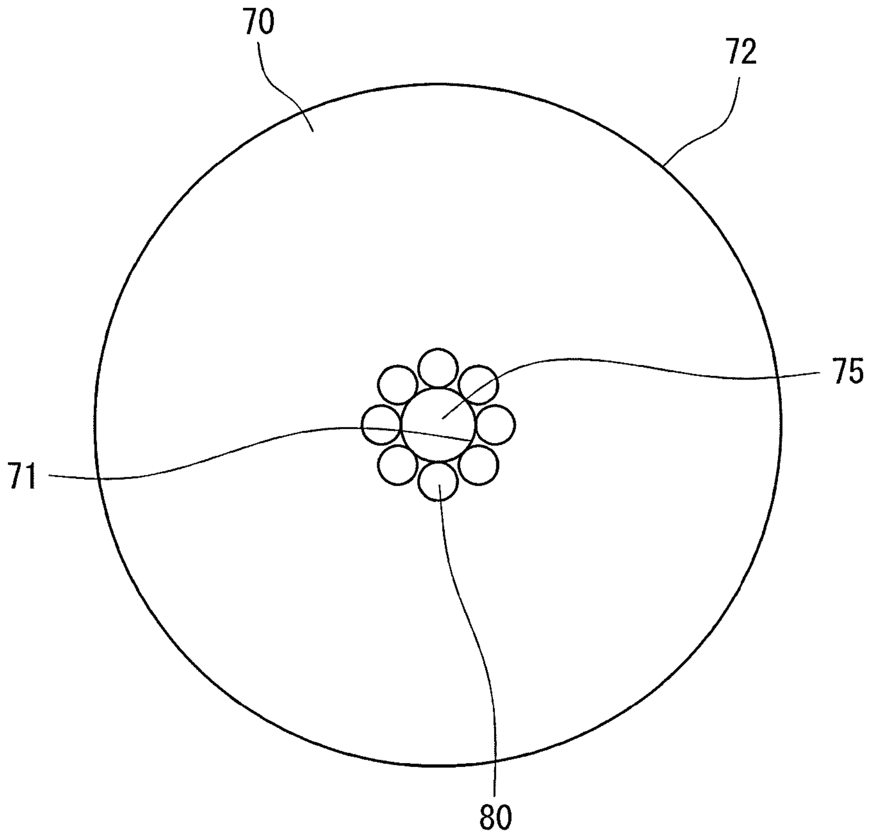
FIG. 6 is a schematic view for explanation of an aspect of disposing an additional member according to an embodiment.

Examples of the arrangement form in which the additional member is unevenly distributed include the following. For example, as illustrated in FIG. 6, a region where the additional member 80 is provided may be formed in a side proximal to the inner edge portion of the insulator 70, and at the same time, a region where the additional member 80 is not provided may be formed in a region other than the side proximal to the inner edge portion of the insulator 70. Alternatively, as illustrated in FIG. 7, a region where the additional member 80 is provided may be formed in a side proximal to the outer edge portion of the insulator 70, and at the same time, a region where the additional member 80 is not provided may be formed in a region other than the side proximal to the outer edge portion of the insulator 70.

In one aspect, the additional member 80 disposed in the insulator 70 may be disposed in a state in which a plurality of the additional members 80 are adjacent to each other. In other words, a plurality of the additional members 80 may be disposed so as to be close to each other. For example, in FIGS. 4 and 6, the additional members 80 in the insulator 70 are disposed to be close to each other while being spaced apart from each other. Such an arrangement can further reduce movement of a fluid such as a gas between the inside of the battery and the outside of the battery. In FIGS. 7 and 8, the additional members 80 are disposed in contact with each other. Such an arrangement can still further reduce movement of a fluid such as a gas between the inside of the battery and the outside of the battery.

As another aspect, as illustrated in FIG. 8, a region where the additional member 80 is provided may be formed between the inner edge portion of the insulator 70 and the outer edge portion of the insulator 70. As still another aspect, for example, a region where the additional member 80 is provided may be formed along both the inner edge portion of the insulator 70 and the outer edge portion of the insulator 70.

Figure 7:
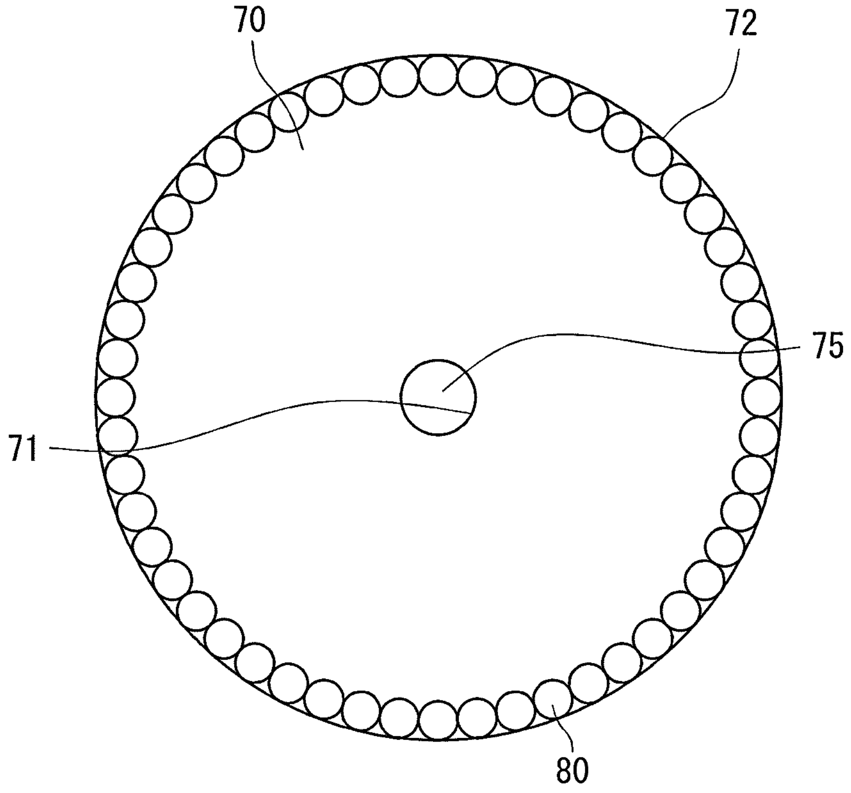
FIG. 7 is a schematic view for explanation of an aspect of disposing an additional member according to an embodiment.
Figure 8:
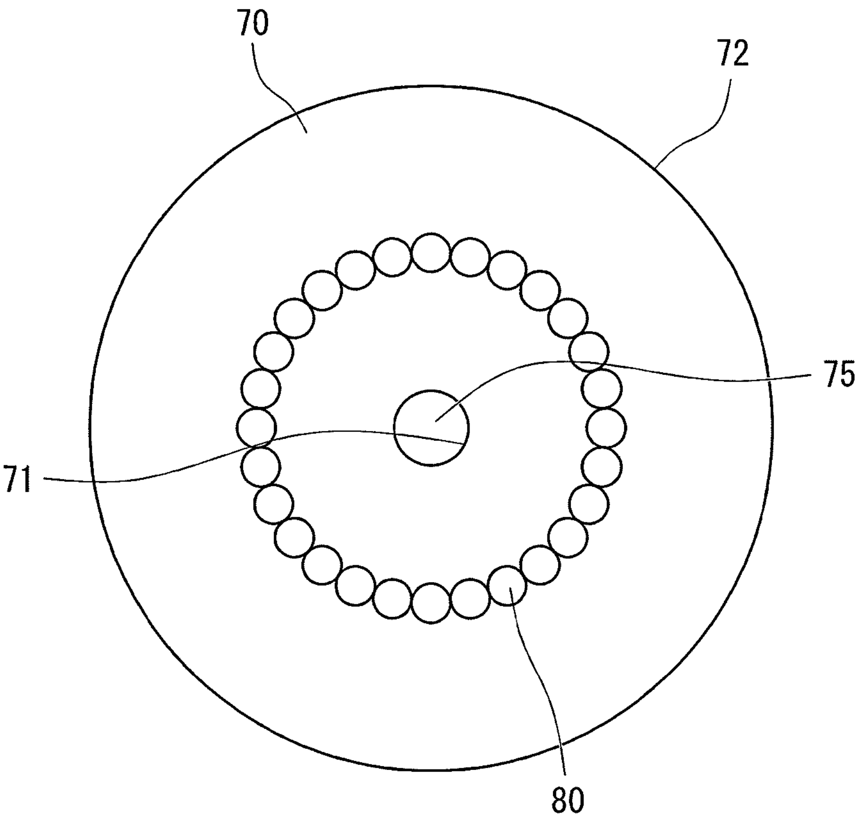
FIG. 8 is a schematic view for explanation of an aspect of disposing an additional member according to an embodiment.

In FIGS. 6 to 8, the additional members 80 are disposed to be adjacent to and in contact with each other without a gap, but these are merely views schematically illustrating the present disclosure, and the present disclosure is not limited to such an arrangement. For example, as illustrated in FIG. 4, the additional members 80 may be disposed without being in contact with each other. Also in the arrangement illustrated in FIG. 4, the additional member is circularly and intermittently disposed, and therefore movement of a fluid such as a gas can be further reduced between the inside of the battery and the outside of the battery.

In an embodiment, as illustrated in FIG. 3, the insulator 70 may have a form having the through-hole 75. In a case where the insulator 70 has a form having the through-hole 75, the additional member 80 may surround the through-hole 75 of the insulator 70 as illustrated in the plan view of FIG. 4. That is, the additional member 80 may be disposed so as to surround the through-hole 75. If the additional member 80 is disposed in such an arrangement, a region that prevents a fluid such as gas from moving can be efficiently formed around the through-hole 75. That is, a form is obtained in which the additional member 80 is relatively densely disposed around the through-hole 75 of the insulator 70, and it is possible to further reduce the passage of a fluid that can pass between the outside of the battery and the inside of the battery. Therefore, it is possible to further reduce movement of a fluid such as a gas between the inside of the battery and the outside of the battery.

As illustrated in FIG. 5, the insulator 70 having the through-hole 75 has a side surface, due to its shape, on each of the inner side of the insulator 70 and the outer side of the insulator 70. Specifically, the insulator 70 having the through-hole has an inner side surface 71 located on the inner edge portion side of the insulator 70 and an outer side surface 72 located on the outer edge portion side of the insulator 70. The inner side surface 71 is a surface that forms the through-hole 75 of the insulator 70. The outer side surface 72 is a surface that forms the outer contour of the insulator 70.

The additional member 80 may be disposed along the contour of at least one of the outer side surface 72 of the insulator 70 and the inner side surface 71 of the insulator 70. In this case, the additional member 80 may be disposed on the contour surface of at least one of the outer side surface 72 of the insulator 70 and the inner side surface 71 of the insulator 70, or may be disposed in a local part, in the insulator, proximal to this contour surface.

For example, the additional member 80 may be disposed as illustrated in FIG. 6. In FIG. 6, the additional member 80 is disposed along the inner side surface 71 of the insulator 70. In FIG. 6, the shape formed by the inner side surface 71 (that is, the shape of the through-hole 75) is circular, and therefore the arrangement form of the additional member 80 is circular.

In this case, the additional member 80 can have an arrangement form corresponding to the shape of the through-hole 75. If the additional member 80 is disposed in this manner, the fluid movement between the outside of the battery and the inside of the battery through the insulator 70 is more easily reduced. The additional member 80 is provided along the inner side surface 71, and therefore it is particularly easier to reduce leakage of a fluid such as the electrolytic solution and/or a gas generated from the electrolytic solution from the inside of the battery to the outside of the battery through the insulator 70. Therefore, the amount of the electrolytic solution or the like in the battery is less likely to be reduced, and the battery performance is more easily maintained. If the additional member 80 is provided along the contour of the inner side surface 71, a fluid such as the electrolytic solution and/or a gas generated from the electrolytic solution is less likely to come into contact with the insulator 70, and deterioration of the insulator 70 is more easily suppressed. Such deterioration suppression makes it easy to maintain the adhesion function of the insulator 70 between the first exterior portion 40 and the second exterior portion 50. Thus, separation of the first exterior portion 40 and the second exterior portion 50 can be suitably suppressed.

As another aspect, the additional member 80 may be disposed as illustrated in FIG. 7. In FIG. 7, the additional member 80 is disposed along the outer side surface 72 of the insulator 70. In FIG. 7, the shape formed by the outer side surface 72 (that is, the outer contour of the insulator 70) is circular, and therefore the arrangement form of the additional member 80 is circular.

In this case, the additional member 80 can have an arrangement form corresponding to the shape of the outer contour of the insulator 70. If the additional member 80 is disposed in this manner, the fluid movement between the outside of the battery and the inside of the battery through the insulator 70 is more easily reduced. In particular, since the additional member 80 is provided along the contour of the outer side surface 72, a fluid such as a gas from the outside (for example, water vapor) is less likely to come into contact with the insulator 70, and deterioration of the insulator 70 by a gas such as water vapor is more easily suppressed. Such deterioration suppression makes it easy to maintain the adhesion function of the insulator 70 between the first exterior portion 40 and the second exterior portion 50, and separation of the first exterior portion 40 and the second exterior portion 50 can be suitably suppressed.

From the viewpoint of suppressing intrusion of a fluid such as a gas from the outside into the battery through the insulator 70, the additional member 80 may be provided at a location away from the outer side surface 72 of the insulator 70 by a predetermined distance. Specifically, referring to the sectional view of FIG. 5 and the distance L from the inner side surface 71 to the outer side surface 72 of the insulator 70, the additional member 80 may be disposed at a position at a distance of up to 0.5 L, and preferably may be disposed at a position at a distance of up to 0.3 L from the outer side surface 72 of the insulator 70.

From the viewpoint of suppressing leakage of a fluid such as a gas from the inside to the outside of the battery through the insulator 70, the additional member 80 may be provided at a location away from the inner side surface 71 of the insulator 70 by a predetermined distance. Specifically, referring to the sectional view of FIG. 5 and the distance L from the inner side surface 71 to the outer side surface 72 of the insulator 70, the additional member 80 may be disposed at a position at a distance of up to 0.5 L, and preferably may be disposed at a position at a distance of up to 0.3 L from the inner side surface 71 of the insulator 70.

As shown in the sectional view of FIG. 5, the sealing length w of the additional member is smaller than the distance L from the inner side surface 71 to the outer side surface 72 of the insulator 70, and for example, the sealing length w of the additional member may be about $0.001\ L \leq W \leq 0.5\ L$, preferably about $0.001\ L \leq W \leq 0.3\ L$, or about $0.001\ L \leq W \leq 0.1\ L$.

As described above, in an embodiment of the present disclosure, the additional member can have various arrangement forms in the insulator. That is, an arrangement is to be adopted such that among the additional members disposed in the insulator, a certain additional member is taken as a starting point and the additional members are disposed from the starting point so as to environ a predetermined location (for example, the through-hole) of the insulator and finally return to the additional member taken as the starting point. For example, the arrangement form of the additional member may be a circular or annular form as illustrated in FIGS. 6 to 8. Alternatively, an arrangement structure may be adopted that has a rectangular, polygonal, elliptical, or indeterminate form. In an embodiment of the present disclosure, a plurality of these arrangement forms may be adopted. For example, in addition to the arrangement form in which the additional member is provided in the side proximal to the inner edge portion of the insulator 70 as illustrated in FIG. 6, an arrangement form may be adopted in which the additional member is further disposed "circularly and intermittently" in the outer edge side of the insulator. Specifically, an arrangement form may be adopted in which the arrangement form of the additional member illustrated in FIG. 6 and the arrangement form of the additional member illustrated in FIG. 7 are combined.

The percentage of the region occupied by the additional member in the entire insulator provided with the additional member may be, for example, 0.05 vol % or more and 30 vol % or less, and more preferably 0.05 vol % or more and 10 vol % or less with respect to the entire insulator provided with the additional member. In a case where the percentage of the region occupied by the additional member in the entire insulator provided with the additional member is in the above range, the fluid movement between the inside of the battery and the outside of the battery through the insulator is further suppressed and the adhesiveness of the insulator is more suitably and easily exhibited. That is, performance in which both the properties are more suitably balanced can be exhibited.

In an embodiment of the present disclosure, the additional member can reduce the fluid movement between the outside of the battery and the inside of the battery through the insulator. The additional member can close a passage through which a fluid such as a gas can move in the insulator. In other words, the additional member can seal or block a passage through which a fluid such as a gas can move in the insulator. In view of this point, the additional member may also be referred to as a fluid movement suppression member, a sealing member against fluid movement, or a fluid movement block member between the outside of the battery and the inside of the battery.

In a case where the fluid that can move between the inside of the battery and the outside of the battery through the insulator is a gas, the additional member may be a member for sealing against gas leakage for suppression of gas movement between the inside of the battery and the outside of the battery.

If the through-hole 75 is provided in the insulator 70, a part of the second exterior portion 50 can face the electrode assembly 10 in the battery as illustrated in FIG. 5. Therefore, the second exterior portion 50 and the electrode assembly 10 are electrically connected easily. In the case of such an aspect, the second exterior portion 50 can function as an external terminal (terminal) for extraction of electricity to the outside.

The present disclosure can be embodied in various aspects. For example, the additional member may be included in or disposed on the insulator. Hereinafter, the aspects will be specifically described.

In one aspect, the additional member is provided in the insulator. That is, the additional member is present inside the insulator.

In this aspect, due to the form in which the additional member is provided in the insulator, the additional member 80 can be disposed so as to partition the insulator 70 into the inner region and the outer region of the circling shape of the additional member 80. That is, as illustrated in the plan view of FIG. 8, the insulator 70 can be partitioned into a region located in the relatively inner side (that is, the inner edge portion side) and a region located in the relatively outer side (that is, the outer edge portion side) of the insulator 70 with the circling shape due to the arrangement of the additional member 80 as a boundary. In FIG. 8, the region located relatively in the inner edge portion side includes a region including only the through-hole 75 of the insulator 70 and the insulator 70, and the region located relatively in the outer edge portion side includes a region including only the insulator 70. If such an aspect is adopted, the additional member can maintain the adhesion function of the insulator between the first exterior portion and the second exterior portion while suppressing movement of a fluid such as a gas. That is, the suppression of movement of a fluid such as a gas and the adhesion function can be balanced with each other.

The additional member may include a filler. The additional member may include a filler alone, or may include a member other than the filler. In an embodiment of the present disclosure, an organic material and/or an inorganic material described in detail below may be used as the filler, and a filler having both an electric insulation property and a sealing property against gas leakage may be used.

In the case of using a filler as the additional member provided in the insulator, the additional member may include a plurality of fillers disposed densely. The term "a plurality of fillers disposed densely" means, for example, fillers disposed at a predetermined location intensively. In other words, the term means a filler region formed by disposing a plurality of fillers to be close to or adjacent to and in contact with each other at a predetermined location. Such an arrangement form of the filler further facilitate suppression of the fluid movement between the inside of the battery and the outside of the battery through the insulator.

The shape of the filler may be, for example, spherical, granular, needle-like, plate-like, fibrous, and/or indeterminate. From the viewpoint of reducing the movement of a fluid between the inside and the outside of the battery, the shape of the additional member may be spherical. In a case where the shape of the additional member is spherical, the thickness of the insulator including the additional member after press is more likely to be uniform. The insulator material including the spherical additional member has an adhesive interface in point contact, and therefore the sealing property against fluid leakage is easily enhanced while the adhesive strength is maintained.

In a method of providing the additional member in the insulator, the additional member may be disposed and formed during preparation of the insulator. For example, the method may be achieved by embedding the additional member in an insulator raw material (for example, a softened resin, a liquid resin, or the like) molded into a predetermined shape.

In another aspect, the additional member is provided on the insulator. That is, the additional member is provided on the surface of the insulator, and the additional member is exposed to the outside of the insulator. Specifically, the surface of the insulator on which the additional member is provided can be, for example, at least one of the inner side surface or the outer side surface of the insulator. The phrase "the additional member is provided on at least one of the inner side surface or the outer side surface of the insulator" may refer to covering the inner side surface and/or the outer side surface of the insulator with the additional member. For example, a covering member such as a tape-shaped member or a coating member may be used as the additional member. In this aspect, the arrangement form is to be such that the additional member is disposed at least intermittently, and the additional member may be disposed continuously.

Specifically, as illustrated in FIG. 9, the additional member 80 may cover the outer side surface 72 of the insulator 70. By adopting such an aspect, the outer side surface 72 of the insulator 70 can be shielded from a gas such as moisture existing outside. That is, the intrusion of a gas such as moisture from the outside into the insulator 70 is more easily reduced. Since the intrusion of a gas such as moisture from the outside into the insulator 70 is more easily reduced, the possibility is also easily reduced that the insulator 70 comes into contact with a gas such as moisture and deteriorates. Therefore, a defect is easily reduced such that the adhesive force of the insulator 70 decreases due to the deterioration of the insulator 70 and the insulator 70 is peeled off from the first and the second exterior portions.

Figure 10:
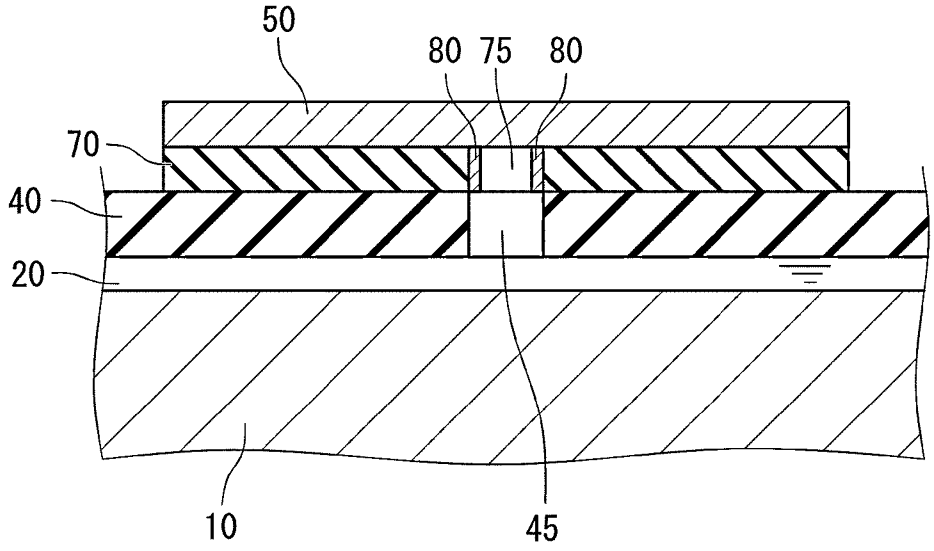
FIG. 10 is a schematic sectional view for explanation of an aspect of disposing an additional member according to an embodiment.

As illustrated in FIG. 10, the additional member 80 may cover the inner side surface 71 of the insulator 70, and by adopting such an aspect, the inner side surface 71 of the insulator 70 can be shielded from a gas of the electrolytic solution or the like present inside the battery. That is, the intrusion of a gas such as the volatilized electrolytic solution inside the battery into the insulator 70 is easily reduced. Therefore, a defect is easily reduced such that a gas such as the volatilized electrolytic solution intrudes into the insulator 70 to cause decrease in the amount of the electrolytic solution 20 and deterioration of the battery performance. Furthermore, the possibility is also easily reduced that a gas such as the volatilized electrolytic solution intrudes into the insulator 70 to cause deterioration of the insulator 70. Therefore, a defect is also easily reduced such that the adhesive force of the insulator 70 decreases due to the deterioration of the insulator 70 and the insulator 70 is peeled off from the first and the second exterior portions.

In a method of providing the additional member on the insulator, the insulator may be covered with the additional member after the first exterior portion is covered with the second exterior portion. Alternatively, the insulator covered with the additional member in advance may be used.

Figure 11:
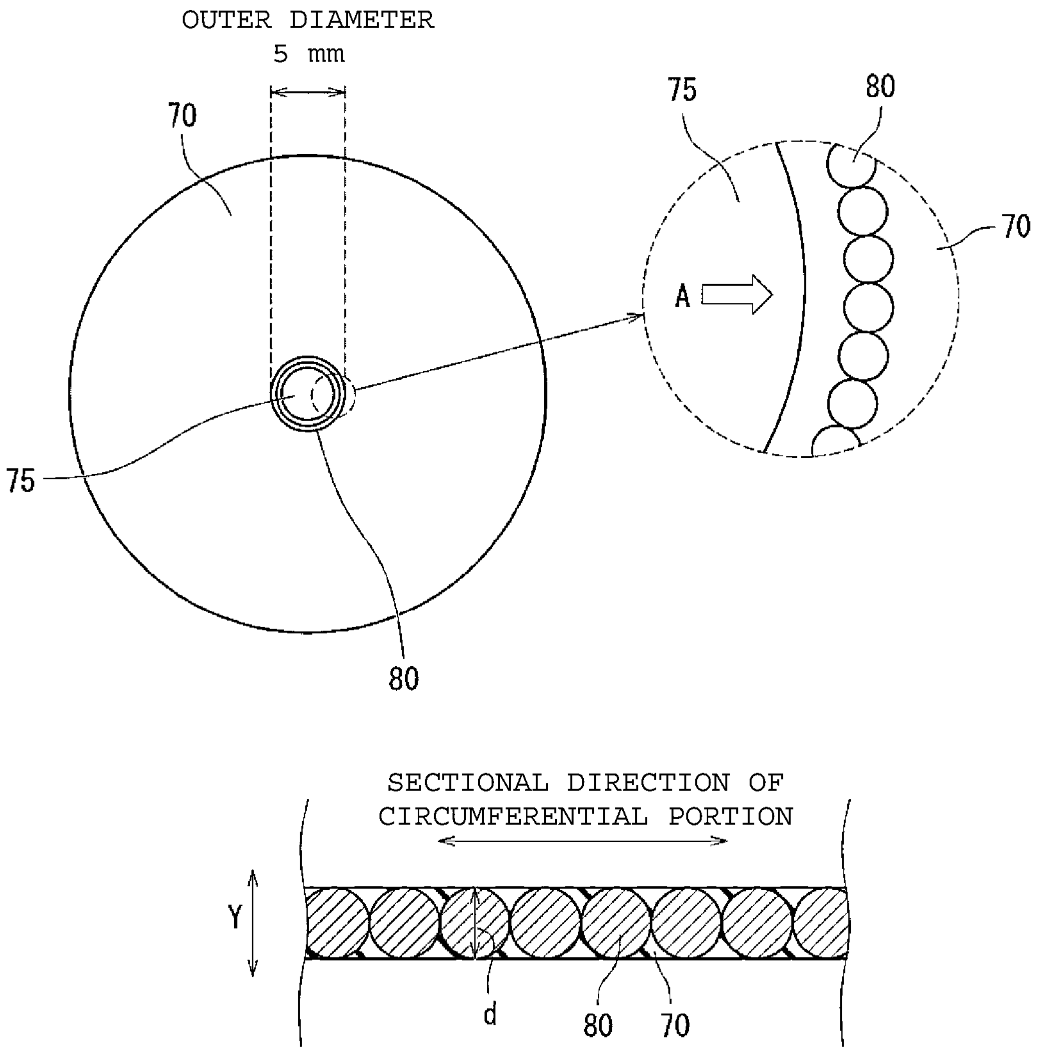
FIG. 11 is a schematic view for explanation of an aspect of disposing an additional member according to an embodiment in a sectional direction of a circumferential portion.

An embodiment of the present disclosure has the above-described characteristics, and thus can provide a secondary battery that copes with the movement of a fluid such as a gas between the inside of the battery and the outside of the battery. Specifically, in the secondary battery of the present disclosure, the movement of a fluid between the inside of the battery and the outside of the battery can be reduced. For example, as shown from a viewpoint from the direction of the arrow A (sectional direction of the circumferential portion) in FIG. 11, if 314 spherical additional members having a particle size d of 50 μm are circularly laid in the insulator having a thickness Y of 50 μm so as to form a ring having an outer diameter of 5.00 mm and an inner diameter of 4.95 mm around the through-hole 75 (see the plan view and the partly enlarged view in FIG. 11), 79% of the sectional area of the circumferential portion can be sealed with the additional members, and the sealing property against gas leakage is improved by 79%.

In the case of providing the additional member in the insulator, that is, in the case of using a filler as the additional member, the thickness of the additional member may be, for example, 1 μm or more and 500 μm or less, and preferably 5 μm or more and 300 μm or less. If the thickness of the additional member is in the above range, an effect of the present disclosure is more likely to be apparent. The term "thickness of the additional member" in the case of using a filler as the additional member means the maximum length of the additional member 80 in the linear direction orthogonal to the main surface of the first exterior portion 40 and the main surface of the second exterior portion 50 sandwiching the insulator 70 in the sectional view as illustrated in FIG. 5.

In the case of providing the additional member on at least one of the inner side surface or the outer side surface of the insulator, that is, in the case of using a covering member as the additional member, the width of the additional member may be, for example, 1 μm or more and 500 μm or less, and preferably 5 μm or more and 300 μm or less. If the width of the additional member is in the above range, an effect of the present disclosure is more likely to be apparent. The term "width of the additional member" in the case of using a covering member as the additional member means the maximum length of the additional member 80 in the linear direction orthogonal to the main surface of the first exterior portion 40 and the main surface of the second exterior portion 50 sandwiching the insulator 70 in the sectional view as illustrated in FIG. 9.

The thickness or width of the additional member and the thickness of the insulator may be substantially the same. Specifically, in the case of using a filler as the additional member, as shown in FIG. 5, the thickness $T_1$ of the additional member and the thickness $T_2$ of the insulator may be substantially the same. In a case where the thickness $T_1$ of the additional member and the thickness $T_2$ of the insulator are substantially the same, the fluid movement between the inside of the battery and the outside of the battery through the insulator 70 is more easily suppressed. Alternatively, in the case of using a covering member as the additional member, as shown in FIG. 9, the width $T_3$ of the additional member and the thickness $T_2$ of the insulator may be substantially the same. In a case where the width $T_3$ of the additional member and the thickness $T_2$ of the insulator are substantially the same, the fluid movement between the inside of the battery and the outside of the battery through the insulator 70 is more easily suppressed.

The aspect in which the thickness of the additional member and the thickness of the insulator are substantially the same in the case of using a filler as the additional member is also an aspect due to the method of manufacturing the secondary battery. Specifically, when the first exterior portion and the second exterior portion are adhered and insulated using the insulator provided with the additional member, press may be performed using a press or the like in order to further increase the adhesion strength. Before the press, the "thickness of the additional member" and the "thickness of the insulator" in the insulator provided with the additional member may be greatly different.

In the press process, the insulator is also a "base material" of the additional member, and therefore the insulator, which is present in a relatively larger amount than the additional member, is easily expanded more largely and pressed. That is, in the press process, the insulator can be crushed more than the additional member. In other words, the thickness of the insulator can be reduced by a relatively larger amount than the thickness of the additional member. As the press of the insulator provided with the additional member progresses, the thickness of the insulator in the "base material portion" asymptotically approaches the thickness of the additional member, and finally, the "thickness of the additional member" and the "thickness of the insulator" after the press can be substantially the same.

In a case where the additional member has a relatively higher rigidity than the insulator, the thickness of the insulator after the press can be approximate to the "thickness of the additional member". In this regard, the degree to which the "thickness of the insulator" in the press process is reduced (that is, the amount of the insulator crushed) is easily controlled by providing the additional member in the insulator.

In the case of using a filler as the additional member, the "thickness of the additional member" may be the thickness of an aggregate formed by a plurality of the additional members accumulating, or may be the thickness of the member itself included in the aggregate. For example, the "thickness of the additional member" may be the diameter of one particle included in the filler, or may be the thickness of an aggregate formed by a plurality of particles included in the filler that are accumulating.

As illustrated in FIG. 5 or 9, the additional member may be disposed to be perpendicular to the width direction of the insulator. The "width direction of the insulator" means the extending direction of the main surface of the insulator. In other words, the additional member may be disposed to be parallel to the thickness direction of the insulator. The "thickness direction of the insulator" means the direction indicating the perpendicular distance between one main surface of the insulator and the other main surface of the insulator. Such an arrangement of the additional member facilitates closing of a passage through which a gas or the like as a fluid in the insulator 70 can move, and the fluid movement through the insulator 70 is further suppressed or more easily reduced.

Hereinafter, the material and the like of the additional member will be described in detail.

The additional member may include a material having a low fluid permeability. Specifically, the additional member may include a material having a low gas permeability and/or a material having a low liquid permeability. The term "material having a low gas permeability" means, for example, a material through which a gas is less likely to permeate inside the material. The term "material having a low liquid permeability" means, for example, a material through which a liquid is less likely to penetrate inside the material. That is, the material having a low fluid permeability means a material having a permeability to avoid that a fluid such as a gas in the external environment flows into the battery or a fluid such as a gas in the battery leaks to the outside of the battery to cause characteristic deterioration inconvenient for the battery.

From the viewpoint of reducing the fluid movement between the inside of the battery and the outside of the battery through the insulator, the additional member preferably has a lower fluid permeability than the insulator. In particular, the gas permeability is preferably lower than that of the insulator. In other words, the permeation amount of the gas is preferably smaller than that in the insulator.

For example, the additional member may be a material through which water vapor is less likely to permeate. The material through which water vapor is less likely to permeate means a material having a water vapor transmission rate of less than 1.0 g/($m^2$·Day). Specifically, the additional member may have a water vapor transmission rate of preferably 0 or more and less than $5\times10^{-3}$ g/($m^2$·Day). Note that the term "water vapor transmission rate" in the present description refers to a transmission rate obtained by the MA method under measurement conditions of 85 °C and 85% RH using a gas transmission rate measuring device of model WG-15S manufactured by MORESCO Corporation.

From the viewpoint of insulating the first exterior portion and the second exterior portion, the additional member preferably has an insulating property (that is, electric insulation property). The degree of the insulating property of the additional member is not particularly limited as long as a general "insulating property" is exhibited.

From the viewpoint that the additional member provided in the insulator suppresses movement of a fluid in the insulator and insulates the first and the second exterior portions, the additional member preferably has both a small fluid permeation amount and an insulating property.

The material used in the additional member is not particularly limited as long as the material has a low fluid permeability and/or an insulating property. For example, the additional member may include an inorganic material, an organic material, or a mixture thereof.

As the inorganic material used in the additional member, for example, a metal oxide, a silicon oxide, an inorganic salt, and/or a metal nitride may be used. Specifically, titanium oxide, alumina, ferrite, a ceramic, silica, or the like may be used in the additional member.

The organic material used in the additional member may be, for example, a material containing a resin component. Specifically, the additional member may contain a thermoplastic resin component and/or a thermosetting resin component. That is, the organic material may be a thermoplastic resin and/or a thermosetting resin.

As the thermoplastic resin component, for example, at least one may be used that is selected from the group consisting of polyphenylene sulfide, polyamides, polyamideimide, polyarylate, polysulfone, polyethersulfone, polyetheretherketone, polyetherimide, liquid crystal polymers, and thermoplastic polyimides.

As the thermosetting resin component, for example, at least one may be used that is selected from the group consisting of epoxy resins, silicone resins, fluororesins, a urea resin, a melamine resin, polyimides, polyurethane resins, and a diallyl phthalate resin.

Although the embodiments of the present disclosure are described above, they are merely typical examples. Therefore, the present disclosure is not limited to the embodiments, and those skilled in the art will readily understand that various aspects can be conceived.

INDUSTRIAL APPLICABILITY

The secondary battery according to an embodiment of the present disclosure can be used in various fields where power storage is assumed. The secondary battery of the present disclosure can be used in the fields of electricity, information, and communication in which electrical/electronic equipment and the like are used (for example, the fields of electrical/electronic equipment and mobile equipment including mobile phones, smartphones, notebook computers, digital cameras, activity meters, arm computers, electronic paper, wearable devices, and small electronic machines such as RFID tags, card type electronic money, and smartwatches), home and small industrial applications (for example, the fields of electric tools, golf carts, and home, nursing, and industrial robots), large industrial applications (for example, the fields of forklifts, elevators, and harbor cranes), transportation system fields (for example, the fields of hybrid vehicles, electric vehicles, buses, trains, power-assisted bicycles, electric two-wheeled vehicles), power system applications (for example, the fields of various types of power generation, road conditioners, smart grids, and household power storage systems), medical applications (the field of medical equipment such as earphone hearing aids), pharmaceutical applications (the fields of dosage management systems and the like), IoT fields, space and deep sea applications (for example, the fields of space probes and submersibles), and the like, as merely examples.

DESCRIPTION OF REFERENCE SYMBOLS

1: Positive electrode
2: Negative electrode
3: Separator
5: Electrode constituting layer
10, 10': Electrode assembly
20: Electrolytic solution
40, 40': First exterior portion
41: Outer surface of first exterior portion
45, 45': Opening of first exterior portion
50, 50': Second exterior portion
60, 60': Terminal
70, 70': Insulator
71: Inner side surface of insulator
72: Outer side surface of insulator
75: Insulator through-hole
80: Additional member
90: Fluid flow
100, 100': Secondary battery
$T_1$: Thickness of additional member
$T_2$: Thickness of insulator
$T_3$: Width of insulator
W: Sealing length of additional member
L: Distance between inner side surface and outer side surface It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
an electrode assembly;
a first exterior portion housing the electrode assembly and having an opening;
a second exterior portion covering the opening and an outer surface of the first exterior portion, the outer surface forming the opening; and
an insulator disposed between the outer surface of the first exterior portion and the second exterior portion, the insulator surrounding the opening,
the insulator in which an additional member is circularly and intermittently disposed around the opening.

2. The secondary battery according to claim 1, wherein the additional member is unevenly distributed in the insulator.

3. The secondary battery according to claim 1, wherein
the insulator includes a through-hole, and
the additional member surrounds the through-hole.

4. The secondary battery according to claim 1, wherein the additional member is disposed along a contour of at least one of an outer side surface of the insulator or an inner side surface of the insulator.

5. The secondary battery according to claim 1, wherein a thickness or a width of the additional member and a thickness of the insulator are substantially equal to each other.

6. The secondary battery according to claim 1, wherein the additional member is provided in the insulator.

7. The secondary battery according to claim 6, wherein the additional member is disposed so as to partition the insulator into an inner region and an outer region of a location at which the additional member is formed.

8. The secondary battery according to claim 6, wherein the additional member includes a filler.

9. The secondary battery according to claim 8, wherein, in the insulator, the additional member includes a plurality of the fillers disposed densely.

10. The secondary battery according to claim 8, wherein the filler has a spherical shape.

11. The secondary battery according to claim 1, wherein the additional member is provided on at least one of the inner side surface of the insulator or the outer side surface of the insulator.

12. The secondary battery according to claim 1, wherein the additional member is a member capable of suppressing fluid movement between the outer side surface of the insulator and the inner side surface of the insulator.

13. The secondary battery according to claim 12, wherein the additional member is a member for sealing against gas leakage.

* * * * *